(12) United States Patent
Neilsen

(10) Patent No.: US 8,594,641 B2
(45) Date of Patent: Nov. 26, 2013

(54) REMINDER HANDLING

(75) Inventor: Peter Dam Neilsen, Kgs Lyngby (DK)

(73) Assignee: Nokia Corporation, Espoo (FI)

( * ) Notice: Subject to any disclaimer, the term of this patent is extended or adjusted under 35 U.S.C. 154(b) by 568 days.

(21) Appl. No.: 10/551,886

(22) PCT Filed: Apr. 17, 2003

(86) PCT No.: PCT/IB03/01640
§ 371 (c)(1),
(2), (4) Date: Oct. 4, 2005

(87) PCT Pub. No.: WO2004/093475
PCT Pub. Date: Oct. 28, 2004

(65) Prior Publication Data
US 2006/0195518 A1    Aug. 31, 2006

(51) Int. Cl.
*H04M 3/42* (2006.01)
*H04M 1/725* (2006.01)

(52) U.S. Cl.
USPC .................................. 455/415; 455/412.2

(58) Field of Classification Search
USPC .................. 455/415, 412.2, 418, 419, 420
See application file for complete search history.

(56) References Cited

U.S. PATENT DOCUMENTS

| | | | |
|---|---|---|---|
| 4,481,382 A | 11/1984 | Villa-Real | 455/418 |
| 5,559,860 A | 9/1996 | Mizikovsky | 455/415 |
| 5,664,063 A | 9/1997 | Johnson et al. | 705/1 |
| 5,790,974 A | 8/1998 | Tognazzini | 455/456 |
| 6,263,209 B1 | 7/2001 | Reed et al. | 455/456 |
| 6,304,170 B1 | 10/2001 | Armstrong et al. | 455/567 |
| 6,308,062 B1 | 10/2001 | Chien et al. | 455/556 |
| 7,130,617 B2 * | 10/2006 | Matsumoto et al. | 455/412.2 |
| 7,212,827 B1 | 5/2007 | Veschl | 455/456.1 |
| 7,221,937 B2 * | 5/2007 | Lau et al. | 455/419 |
| 7,440,748 B2 * | 10/2008 | Matsumoto et al. | 455/412.2 |

(Continued)

FOREIGN PATENT DOCUMENTS

| | | |
|---|---|---|
| CA | 2292235 | 6/2001 |
| DE | 10138224 A1 | 2/2003 |

(Continued)

OTHER PUBLICATIONS

Simon Says "Organize" by Bell South, 1994.

*Primary Examiner* — Kwasi Karikari
*Assistant Examiner* — Emem Stephen
(74) *Attorney, Agent, or Firm* — Harrington & Smith

(57) ABSTRACT

A mobile telephone (1) includes associated with a processor (18) a reminder controller (22). A reminder can be entered either using the phone (1) or using a remote terminal, such as a PC or another phone. Each reminder is associated with an event being the start of a particular application, or an event being an identifier in a software application becoming a preset value. For example, a reminder may be entered to thank a friend or family member for a birthday card the next time that a call handler application (31) is commenced and it is determined that a call is being made to or received from that person. The phone (1) operates to detect an application start event, following which it is determined whether a parameter associated with the reminder matches a parameter associated with the application (for example, the outgoing phone number, or CLI), and announces the reminder as appropriate. In this way, enhanced functionality is provided with the phone, since it is possible to set a reminder to be associated with an event other than the reaching of a particular time and date.

23 Claims, 7 Drawing Sheets

(56) References Cited

U.S. PATENT DOCUMENTS

| | | | |
|---|---|---|---|
| 7,484,213 B2 * | 1/2009 | Mathew et al. | 718/100 |
| 2001/0029175 A1 * | 10/2001 | Sellen et al. | 455/412 |
| 2001/0029194 A1 * | 10/2001 | Ketola et al. | 455/567 |
| 2001/0051536 A1 | 12/2001 | Muramatsu | 455/567 |
| 2002/0024540 A1 * | 2/2002 | McCarthy | 345/844 |
| 2002/0087665 A1 * | 7/2002 | Marshall et al. | 709/220 |
| 2002/0194285 A1 | 12/2002 | Mousseau et al. | 709/206 |
| 2003/0018816 A1 | 1/2003 | Godfrey et al. | 709/246 |
| 2003/0087665 A1 | 5/2003 | Tokkonen | 455/556 |
| 2004/0132431 A1 | 7/2004 | Vandermeijden et al. | 455/412.2 |

FOREIGN PATENT DOCUMENTS

| | | |
|---|---|---|
| EP | 1 008 946 A1 | 6/2000 |
| EP | 1 898 614 A2 | 3/2008 |
| WO | WO 02/19181 A2 | 3/2002 |
| WO | WO 02/19181 A3 | 3/2002 |

* cited by examiner

REMINDER HANDLING

FIELD OF THE INVENTION

This invention relates to the handling of a reminder on a mobile communications device. In particular, the invention relates to methods of operating a mobile communications device, and to a mobile communications device.

BACKGROUND OF THE INVENTION

It is known to provide with calendar applications on mobile telephones and personal digital assistants (PDAs) a reminder facility. Typically, a user can set a reminder through accessing the calendar, or alternatively through a separate 'reminder' menu option. The setting process involves the entering of a time and date when the reminder is required to be announced, and the entering of text which is to be presented at the time of announcement. Announcement occurs at the set time and date. GB-A-2366696 describes how a reminder facility can be provided without requiring a calendar application.

Whilst reminders of the type described above are easy to set and are widely used by mobile phone users, the inventor has conceived a reminder facility with broader utility.

SUMMARY OF THE INVENTION

According to a first aspect of the invention, there is provided a method of operating a mobile communications device, the method comprising: in response to an application start event, determining if the event is associated with a reminder item stored in a memory, and in the event of a positive determination, controlling the device to announce the reminder item.

This aspect of the invention, as well as the second aspect described below, can provide increased functionality in a mobile communications device such as a cellular phone or PDA. Releasing reminders from specified times and dates can provide more general applicability. This can increase the utility of the device and thereby increase its appeal.

The method may additionally comprise determining also if an identifier associated with the application at the time of the application start event and relating to a device or resource address, a sub-routine or a device setting corresponds to an identifier forming part of the reminder item, and controlling the device to announce only if correspondence is present. Alternatively, the method may additionally comprise determining also if an identifier which relates to a device or resource address, a sub-routine or a device setting and which becomes associated with the application following the application start event and whilst the application is running on the device corresponds to an identifier forming part of the reminder item, and controlling the device to announce only if correspondence is present.

These features can provide further functionality, and can allow for instance announcement to be dependent on a particular webpage being accessed, a particular e-mail address being present on an incoming or outgoing e-mail, or a particular game being started, for example.

Examples of device address identifiers are Internet protocol addresses, mobile telephone numbers (which address a SIM card). Examples of resource address identifiers are URLs, e-mail addresses, identifiers of in-built resources such as particular JAVA™ report tools, games and so on. Sub-routines which could be identified include game high-score routines, a daylight-saving setting change sub-routine, and particular functions of applications, like a send business card function of a phonebook application. A device setting might be a preset number of phonebook entries, a daylight-saving setting, a speaker volume level or the like.

The method preferably comprises determining a telephone number associated with a call handler application on or following a call handler application start event, and controlling the device to announce only if correspondence is present between the telephone number and an identifier forming part of the reminder item. This can allow a reminder to be announced when a call is received from, or made to, a particular colleague, friend or family member, identified by their telephone number or phonebook entry for instance.

According to a second aspect of the invention, there is provided a mobile communications device comprising a controller responsive to an application start event to determine if the event is associated with a reminder item stored in a memory, and responsive to a positive determination to cause announcement of the reminder item.

According to a third aspect of the invention, there is provided a method of operating a mobile communications device, comprising: controlling the device to allow a user to select an application and to allow a user to initiate an application start event reminder; associating the reminder with the application; and storing the reminder with an application indicator in a memory.

The third aspect of the invention, as well as the fifth aspect described below, can allow the straightforward setting up of a reminder associated with an application start event. This can be particularly important in mobile phone and PDA environments where the ease of use of a feature can be so important to the degree of take-up of that feature. An identifier might also be associated with the reminder. Such an identifier could be a telephone number, e-mail address, or it could identify a URL or a particular game, for example.

In the method, the controlling step may include, following controlling the device to allow a user to select an application, controlling the device to present plural options including an option to initiate an application start event reminder. Instead, the controlling step may include, following controlling the device to allow a user to initiate an application start event reminder, controlling the device to present a list of applications. Actually, a device may be arranged so as to allow either method to be used to result in a reminder being stored. Each feature is seen to be particularly convenient The method may comprise controlling the device to allow a user to enter an additional input, for example a text input, and associating the input with the reminder. Additional inputs may take any form, for example images, recorded sounds, generated sounds or audio-visual content. Text is convenient for conveying the kind of information which is normally required of reminders.

Preferably, the method further comprises controlling the device to allow a user to enter or select an identifier, and associating the identifier with the reminder.

This feature can provide further functionality, and can allow for instance announcement to be dependent on a particular webpage being accessed, a particular e-mail address being present on an incoming or outgoing e-mail, or a particular game being started, for example.

According to a fourth aspect of the invention, there is provided a method of operating a mobile communications device, the method comprising: receiving an input comprising an indicator of an application and an indication that an application start event reminder is required; associating the reminder with an application identified by the indicator; and storing the reminder with the or another application indicator in a memory.

Allowing a reminder to be set up remotely in this way can allow still further enhanced functionality. A reminder may be set up by the user him or herself on a PC or other communications terminal, or by a colleague, friend or family member of the user, for example.

Preferably, the method of the third or the fourth aspect comprises, in response to an application start event, determining if the event is associated with a reminder stored in the memory, and, in the event of a positive determination, controlling the device to announce the reminder.

Here, the method advantageously includes, if an identifier associated with the application at the time of the application start event and relating to a device or resource address, a sub-routine or a device setting corresponds to an or the identifier forming part of the reminder item, controlling the device to announce only if correspondence is present. Alternatively, if the identifier is not associated with the application at the time of the application start event, the method may comprise determining also if an identifier which relates to a device or resource address, a sub-routine or a device setting and which becomes associated with the application following the application start event and whilst the application is running on the device corresponds to an or the identifier forming part of the reminder item, and controlling the device to announce only if correspondence is present.

These features can provide further functionality, and can allow for instance announcement to be dependent on a particular webpage being accessed, a particular e-mail address being present on an incoming or outgoing e-mail, or a particular game being started, for example.

Examples of device address identifiers are Internet protocol addresses, mobile telephone numbers (which address a SIM card). Examples of resource address identifiers are URLs, e-mail addresses, identifiers of in-built resources such as particular JAVA™ report tools, games and so on. Sub-routines which could be identified include game high-score routines, a daylight-saving setting change sub-routine, and particular functions of applications, like a send business card function of a phonebook application. A device setting might be a preset number of phonebook entries, a daylight-saving setting, a speaker volume level or the like.

The method preferably comprises determining a telephone number associated with a call handler application on or following a call handler application start event, and controlling the device to announce only if correspondence is present between the telephone number and an or the identifier forming part of the reminder item. This can allow a reminder to be announced when a call is received from, or made to, a particular colleague, friend or family member, identified by their telephone number or phonebook entry for instance.

According to a fifth aspect of the invention, there is provided a mobile communications device comprising a controller arranged to allow a user to select an application, to allow a user to initiate an application start event reminder, to associate the reminder with the application, and to store the reminder with an application indicator in a memory.

According to a sixth aspect of the invention, there is provided a mobile communications device comprising a controller arranged to receive an input comprising an indicator of an application and an indication that an application start event reminder is required, to associate the reminder with an application identified by the indicator, and to store the reminder with the or another application indicator in a memory.

The controller of the fifth or the sixth aspect preferably is responsive to an application start event to determine if the event is associated with a reminder stored in the memory, and to announce the reminder in the event of a positive determination.

The controller here might be arranged to determine also if an identifier associated with the application at the time of the application start event and relating to a device or resource address, a sub-routine or a device setting corresponds to an or the identifier forming part of the reminder item, and to cause announcement only if correspondence is present. The controller might also or instead be arranged to determine also if an identifier which relates to a device or resource address, a sub-routine or a device setting and which becomes associated with the application following the application start event and whilst the application is running on the device corresponds to an or the identifier forming part of the reminder item, and to cause announcement only if correspondence is present.

Examples of device address identifiers are Internet protocol addresses, mobile telephone numbers (which address a SIM card). Examples of resource address identifiers are URLs, e-mail addresses, identifiers of in-built resources such as particular JAVA™ report tools, games and so on. Sub-routines which could be identified include game high-score routines, a daylight-saving setting change sub-routine, and particular functions of applications, like a send business card function of a phonebook application. A device setting might be a preset number of phonebook entries, a daylight-saving setting, a speaker volume level or the like.

In a preferred embodiment, the controller is arranged to determine a telephone number associated with a call handler application on or following a call handler application start event, and to cause announcement only if correspondence is present between the telephone number and an identifier forming part of the reminder item.

BRIEF DESCRIPTION OF THE DRAWINGS

Embodiments of the invention will now be described by way of example with reference to the accompanying drawings, of which.

DETAILED DESCRIPTION

Figure 1:
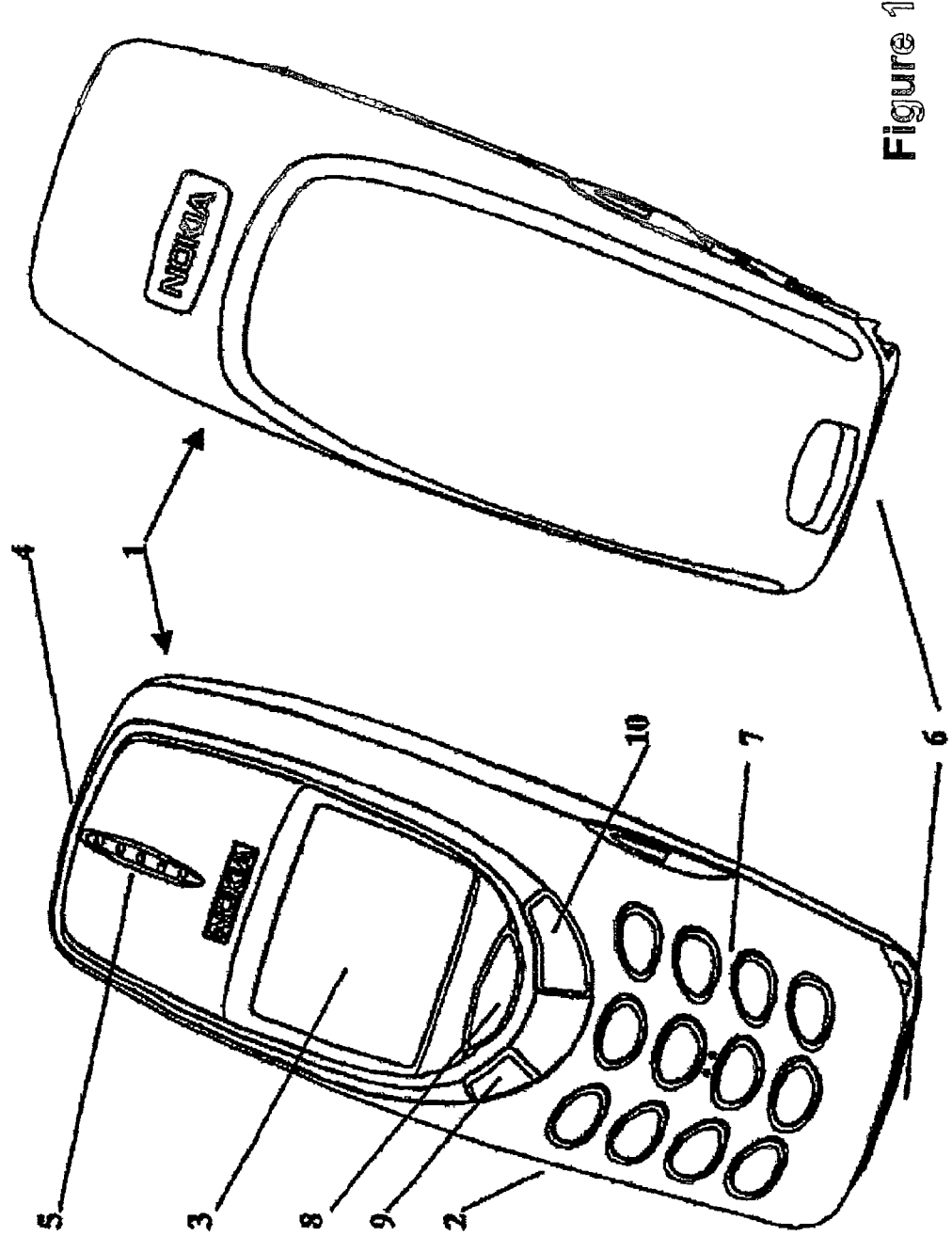
FIG. 1 illustrates the exterior of a phone according to and operating according to various aspect of the invention.

Referring to FIG. 1 the phone, which is generally designated by 1, comprises a user interface having a keypad 2, a display 3, an on/off button 4 (present in the top of the phone and therefore not visible in the present view), a speaker 5, and a microphone 6 (openings present in the bottom of the phone and therefore not visible in the present view). The phone 1 according to the preferred embodiment is adapted for communication via one or more different networks, such as a GSM 900/1800 MHz network, or a third generation (3G) network, the PCN network and so on.

The keypad 2 has a first group 7 of keys as alphanumeric keys, one softkey 8, a cursor navigation key 10 (scroll up/down), and a "clear" key 9 for erasing letters in text in the display 3, for jumping steps down in the menu structure and for rejecting calls. The present functionality of the soft key 8 is shown in separate fields (softkey-label) in the display 3 just above the softkey 8. The softkey 8 is a multifunction key and its present function depends on the state of the phone 1. The softkey 8 gives access to the menu, the phonebook, and call handling and other applications.

Figure 2:
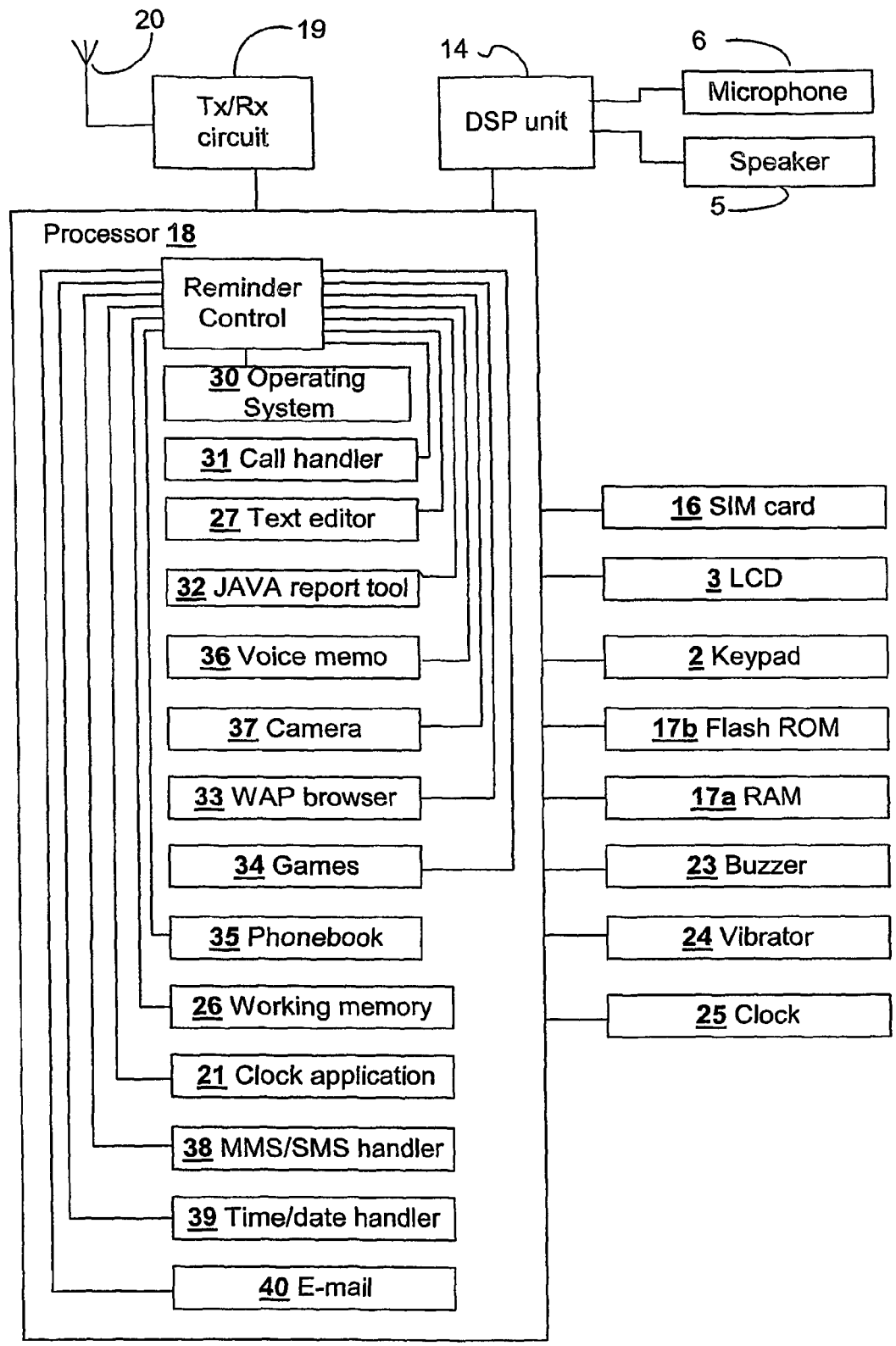
FIG. 2 shows certain components of the FIG. 1 phone and their interconnections.

FIG. 2 schematically shows the most important parts of the phone 1. A part shown in both FIGS. 1 and 2 uses the same reference numeral. A processor 18 controls the communication with the network via a transmitter/receiver circuit 19 and an internal antenna 20.

The microphone 6 transforms speech into analogue signals, which are A/D converted in an A/D converter (not shown) before being encoded in a digital signal processing unit 14 (DSP). The encoded speech signal is transferred to the processor 18, which inter alia supports the GSM and/or 3G terminal software. The processor 18 also forms the interface to the peripheral units of the apparatus, including a RAM memory 17a and a Flash ROM memory 17b, a SIM card 16, a clock 25, the display 3 and the keypad 2 (as well as data, power supply, etc). The digital signal-processing unit 14 speech-decodes the signal, and the result is transferred from the processor 18 to the earpiece 5 via a D/A converter (not shown).

The processor 18 includes a reminder controller 22 controlling the reminder handling according to the invention. The reminder controller 22 is preferably implemented as a software application implemented into the phone software of the terminal 1. The reminder controller 22 is connected to each of the following software applications which are existing in the phone 1: a text editor 27, a working memory 26, a clock application 21, an operating system (OS) 30, a call handling application 31, a JAVA™ report tool 32, a WAP (wireless access protocol) browser 33, a games application 34, a phone book 35, a voice memo application 36, a camera application 37, a short message service (SMS)/multimedia message service (MMS) handler application 38, a time/data handler application 39 and an email application 40. Each of these software applications is operable to perform the tasks usual for such applications, and co-operates with the relevant hardware devices in an appropriate manner.

Generally speaking, the reminder controller 22 operates to allow the input of reminders, to store the reminders in the working memory 26, and to determine when a reminder should be announced, which depends on information contained within the reminder itself. The method for the entering of a reminder on the phone 1 will now be described be described with reference to FIG. 3.

Figure 3:
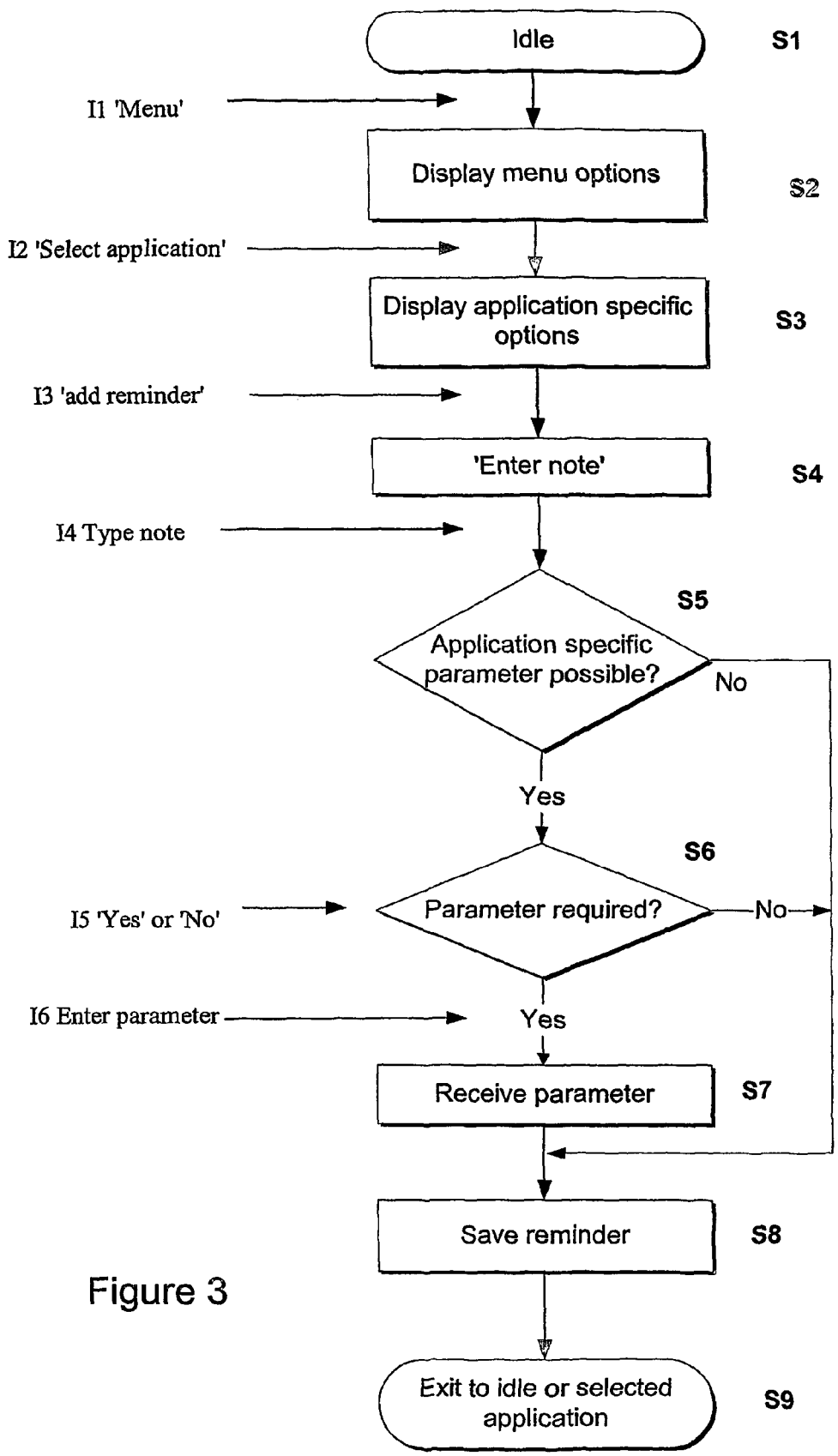
FIGS. 3 and 4 show alternative ways of setting up a reminder according to certain aspects of the invention on the FIGS. 1 and 2 phone.

Referring to FIG. 3, the phone 1 starts in an idle state at S1. Following an input I1 that the menu was required, menu options are displayed on the phone at step S2. Following an input I2 of a software application from the list of menu options to be selected, a list of options specific to that application are displayed at step S3. One of the displayed options is an option to add a reminder for association with that application. It will be appreciated that the application can be any of the applications 21, and 31 to 40 shown in FIG. 2. Following selection of the "add reminder" option at input I3, the phone 1 displays the text "enter note" at step S4. A note is then entered into the phone at input I4. The entering of a note into the phone to be associated with the reminder utilises the text editor 27 and the working memory 26. At step S5, the phone 1 determines whether or not the application selected by the input I2 is such that it is possible to associate an application specific parameter with it. This is discussed in more detail below with reference to the particular applications. If it is determined that an application specific parameter is possible, at step S6 the phone 1 is caused to display a question "is a parameter required?" A user input at I5 determines what happens next. If the input I5 is a "yes" input, the phone progresses to step S7, where an application specific parameter is received following input at I6. Following step S7, or following a negative determination from either of steps S5 and S6, progression is made to step S8 where the reminder is saved. If an application specific parameter was entered, then this parameter is saved along with the reminder. The reminder therefore constitutes the note entered at input I4, an indicator of the application which was selected at input I2, and optionally the parameter entered at input I6. Following step S8, the phone 1 progresses either to exit to an idle state or to the application selected at input I2 at step S9.

Figure 4:
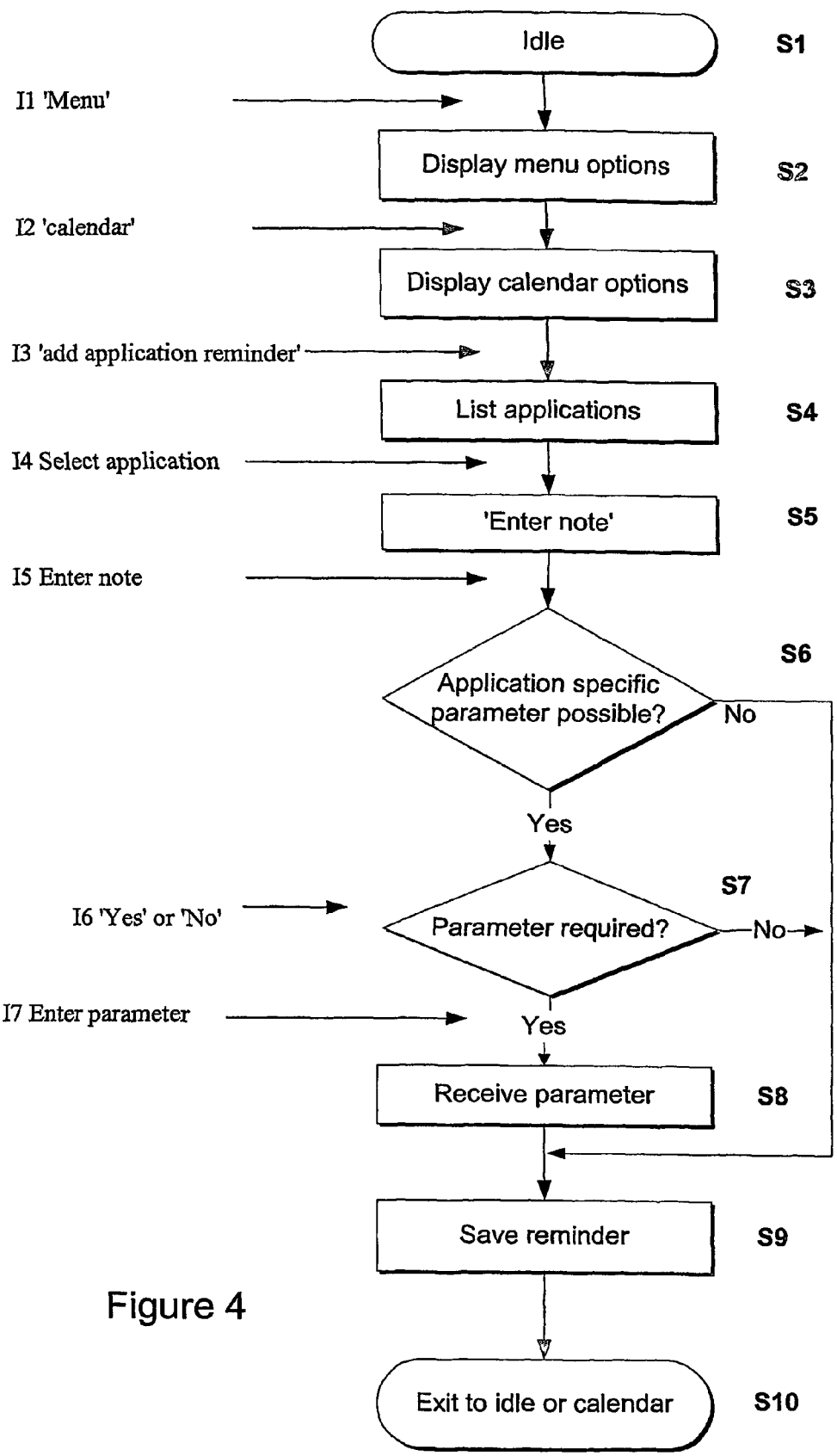

An alternative method of entering a reminder into the phone 1 is shown in FIG. 4. Referring to FIG. 4, operation commences in an idle state at step S1. Following an input I1 by a user seeking the menu of the phone 1, the menu options are displayed at step S2. Following the selection of the calendar menu option by input I2, the phone 1 displays the options relating to the calendar application at step S3. One of these options is an option which allows the entry of a reminder associated with an application start event. Following selection of this option by way of input I3, the phone 1 displays a list of available applications at step S4. The required application is selected by way of an input I4, following which the phone 1 displays at step S5 text requesting the entering of a note to be associated with the reminder. Following entry of a note at input I5, the phone 1 then determines at step S6 whether it is possible to associate an application specific parameter with the applications selected by input I4. If it is determined that an application specific parameter is possible, progression is made to step S7, where the phone 1 requires a user input I6. If the user selects that an application specific parameter is required, progression is made to step S8, where a parameter entered at an input I7 is received and stored in the working memory 26. Following step S8 or following a negative determination from either of steps S6 and S7, progression is made to step S9. The reminder is saved at step S9. As with FIG. 3, the reminder comprises the notes received at input I5, an indicator of the application selected by way of input I4, and any application specific parameter entered at input I7. Following step S9, progression is made to step S10 where the phone 1 either exits to an idle state or to the calendar application.

Example reminders will now be described with reference to FIGS. 3 and 4, although it will be appreciated that these reminders are applicable also to FIGS. 5 and 6 described below.

In a first example, a user wishes to cause the phone 1 to present the text "remember to thank John for his birthday card" on the next occasion that a call is received from John. To enter this reminder, the user must choose whether to use the route of FIG. 3, in which the application is selected before the reminder opinion, or the route of FIG. 4 in which the reminder is selected before the application. Using the operation of FIG. 3, the user at step I2 selects the application, which in this example is the call handling application 31. At step S3, the phone 1 then displays options which ate specific to the call handler application 31. One of these options is an "add reminder" option which is selected by way of input I3. At step S4, the phone 1 then requests the entering of a note to be associated with a reminder, which is received by input I4. At step S5, the phone determines whether it is possible to associate an application specific parameter with this reminder. At this step, the phone 1 determines that it is possible to associate parameters with the call handler application 31, so progression is made to step S6. Determination may occur using a look-up table or by examining a setting of the phone, for example. Here, the user inputs at I5 that an application specific parameter is required, and enters or selects the parameter by way of input I6. Here, the parameter is the telephone number associated with John. The telephone number for John is received at step S7 and the reminder is saved along with the telephone number or an identifier thereof at step S8. Of course, the telephone number of John may be entered manually in the keypad 7, or it may be selected from the phonebook or from an 'unsaved numbers' list in any appropriate manner. In either case, step S8 may involve the storage of the parameter itself (i.e. the telephone number), or instead an identifier which points to that telephone number or to the corresponding phonebook entry. The reminder saved at step S8 also includes an indicator of the caller handler application. The application indicator may take any suitable form.

It will be appreciated how the reminder could be entered into the phone 1 using the alternative operation of FIG. 4. The main difference here is that the available applications are listed at step S4 following the selection of the add application start event reminder option by way of input I2.

The result is a reminder which, as is explained below, will be announced when a call is made to John's telephone number or a call is received which has a CLI (calling line identification) the same as John's telephone number. When the reminder is announced, the note entered at input I5 will be presented on the display of the phone 1.

In another example, the user may enter for storage in the phone 1 a reminder to book an appointment for a manicure the next time that a meeting room is reserved using the WAP browser 33 to access a meeting room reservation web page. In this case, the application that is selected by the user is the WAP browser application 33, and the application specific parameter is the URL (uniform resource locator) of the meeting room reservation website. The URL may be entered manually by the user into the phone 1, or may be selected using a menu system of the phone 1 to access bookmarked web pages.

Another example of a reminder might be to telephone a particular friend with an invitation for a game of golf the next time that a particular JAVA report tool is activated. Here, the application will be the JAVA report tool application 32, the note will be text such as "telephone friend X with golf invite" and the application specific parameter is the particular tool which is required to trigger the announcement of the reminder. Here, the application specific parameter (the particular report tool) might be identified by name, or might be selected from a list of options. In either case, an indicator of identifying the JAVA report tool application is saved as part of the reminder, along with an identifier of the particular report tool that is required to activate the reminder.

Another example of a reminder might be one to challenge a particular friend or family member to a dual or multiplayer game the next time that the games application 34 is commenced. Here, an application specific parameter might be an indicator which identifies the particular game that the user is interested in. Another example might be remind the user to make a backup copy of entries in the phonebook application 35 the next time that five new phonebook entries have been made since the time of the last backup. Here, the application specific parameter might be equal to the number five or might be equal to the number of phonebook entries at the time of the last backup plus five. Such a reminder might prompt the user to make a backup of the phonebook over-the-air to his Internet connected personal computer, for example. A further example of a reminder is one which reminds the user to consider reallocating memory resources next time the voice memo application 36 is started. A similar reminder might be associated with starting the camera application 37, or the SMS/MMS handler application 38. A further example of a reminder is to remind the user to change a seasonal theme of the phone 1 the next time that the time/data handler application 39 is controlled to adjust the daylight-saving time setting thereof. Here, the application specific parameter is an indicator of a change in the daylight-saving time setting, and may or may not be triggered on an increase and a decrease in the setting.

The remote setting up of a reminder on the phone 1 will now be described with reference to FIG. 5. Referring to FIG. 5, an operation is shown operating on a device which is remote from the phone 1. The remote device may take any form, such as, for example an Internet connected personal computer or the like. For the sake of convenience, though, it is assumed here that the operation of FIG. 5 is performed by a phone like the phone 1.

The operation commences at S1, where the phone is in idle mode. Following an input I1 by a user indicating that a menu is required, the phone displays the menu options at step S2. Following an input I2 which is the selection of the calendar menu option, the phone displays the calendar options at step S3. One of the calendar options displayed at S3 is an option allowing the sending of an application start event reminder. Following selection of this option at input I3, the phone displays at step S4 that the recipient of the reminder is to be entered. An input I4 comprises either the entering of or the selection of the recipient of the reminder (by way of the telephone number, e-mail address or other identifier), following which at step S5 the phone presents a list of applications with which the reminder may be associated. One of the applications is selected by way of an input I5, following which the phone displays at step S6 text requiring the entering of a note to be associated with the reminder. Following the entering of a note by way of an input I6, the operation determines at step S7 whether an application specific parameter is possible. If a positive determination is made, the operation progresses to step S8, where the phone requires an input indicating whether or not an application specific parameter is required. If an input I7 indicates that such a parameter is required, then the operation progresses to step S9 following an input I8 of a parameter. As with FIGS. 3 and 4, the parameter may be entered manually, or may be selected, for example, from a phonebook. Following step S9, or if a negative determination is made at either of steps S7 and S8, the operation progresses to step S10, where the reminder is prepared. Preparation involves combining an indicator of the application which is to trigger the reminder, the note entered by way of the input I6, any parameter entered by way of input I8 and an indication of the recipient entered by way of input I4. Optionally, the identity of the recipient may be omitted from the reminder. At step S11, the reminder is sent to the recipient identified by the input I4. Sending may occur in any suitable manner, for example, by SMS, email, or through any other suitable delivery mechanism. Following the sending of the reminder at step S11, the operation progresses to step S12, where the phone exits to an idle state or to the calendar application.

Figure 5:
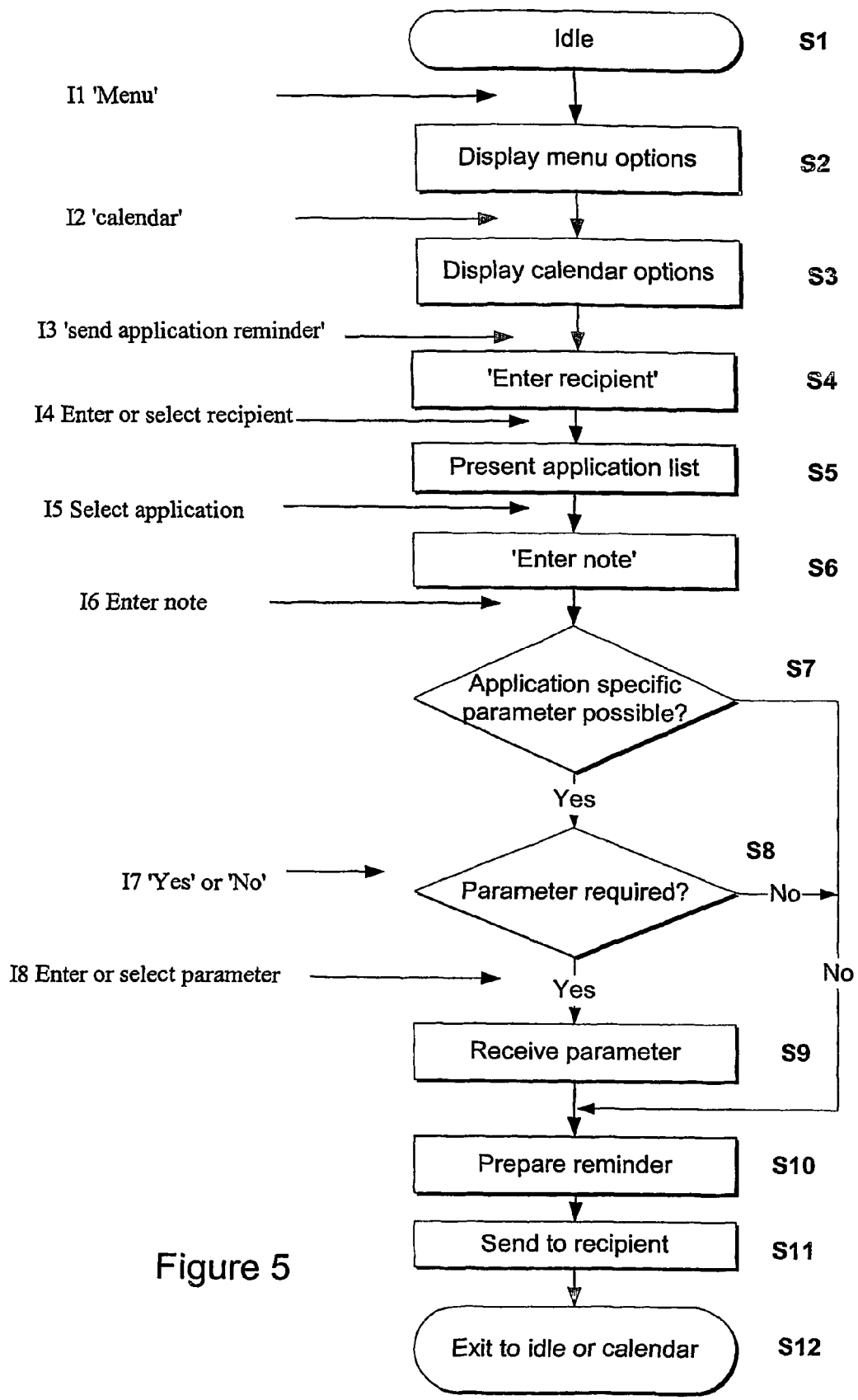
FIGS. 5 and 6 show how a reminder can be entered onto a phone remotely, according to certain aspects of the invention.
Figure 6:
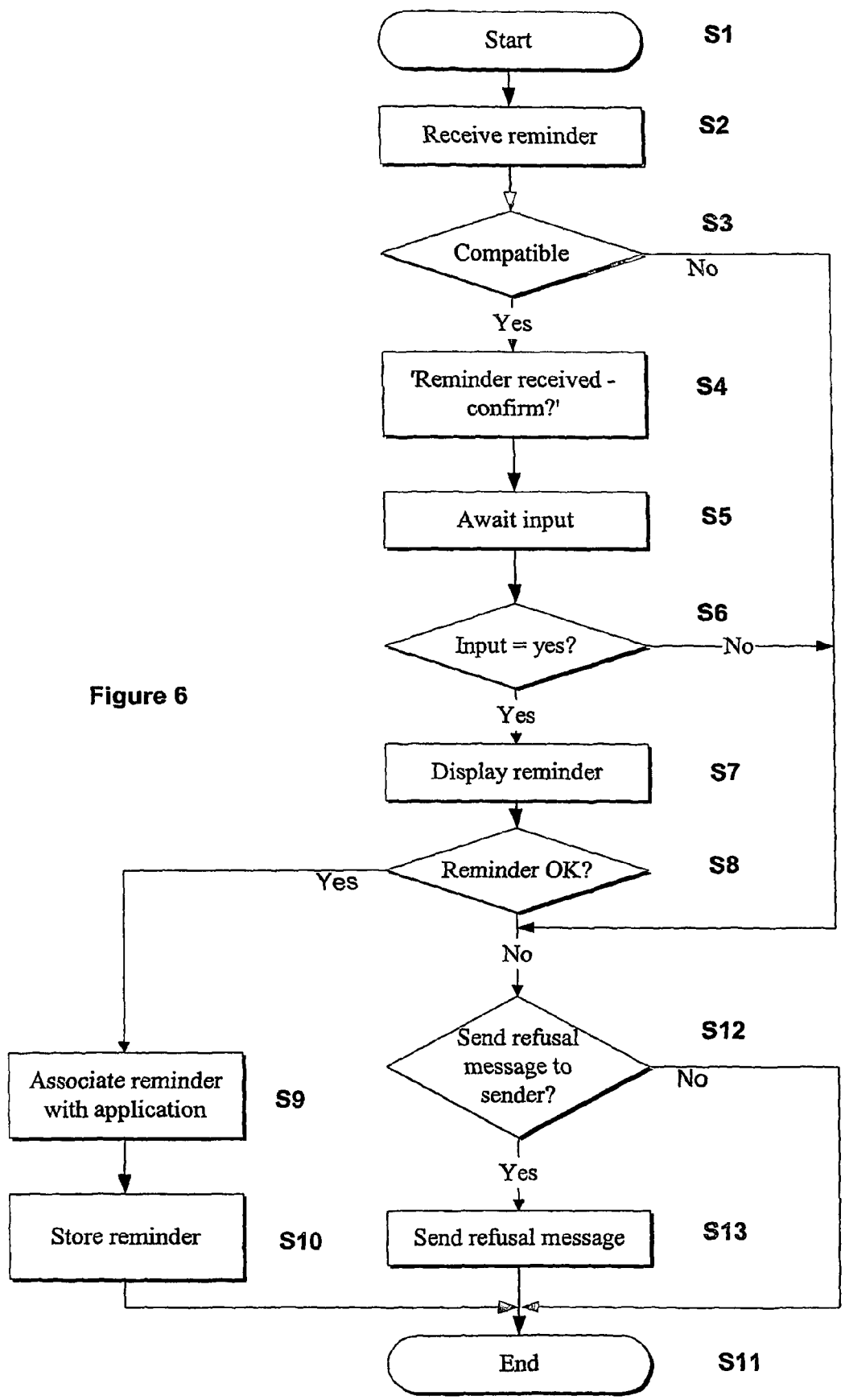

FIG. 6 illustrates operation of the phone 1 when receiving a reminder such as the reminder generated and sent by the operation of FIG. 5. Referring to FIG. 6, the operation begins at step S1, in which the phone 1 may or may not be in an idle mode. A reminder is received at step S2, following which the phone 1 at step S3 determines whether or not the reminder is compatible with the capabilities of the phone. The reminder will not be compatible if, for example, the application identified as being required to trigger the reminder is not an application which is present in the phone 1. If compatibility is found in step S3, the operation proceeds to step S4, where the phone 1 requests the user to confirm that the reminder is to be processed and stored in the phone. An input from the user is awaited at step S5, following which it is determined at step S6 if a positive input has been received. If a user has made a positive input, progression is made to step S7, where the reminder is displayed. If at step S8 the user approves the reminder, the operation progresses to step S9, where the phone 1 associates the reminder with the application identified by the indicator in the reminder. The reminder is then stored at step S10, following which operation progresses to end at step S11. If a negative determination is made at any of steps S3, S6 and S8, the operation progresses to step S12. Here, the phone 1 determines whether or not to send a refusal message to the sender of the reminder. This determination may be made by examining a setting of the phone 1, or alternatively, by requesting the user of the phone to indicate whether or not a refusal message is to be sent. If a refusal message is determined to be required, this is sent at S13, following which progression is made to end at step S11. If no refusal message is required, progression is made from step S12 directly to step S11, where the operation ends. If the operation of FIG. 6 results in a reminder being stored at step S10, then the reminder may be the same as described above with reference to FIGS. 3 and 4. Any such stored reminder would have any of the details entered by way of the operation of FIG. 5. However, the indicator which is used to associate the reminder with the application which is required to trigger the reminder may be changed from (i.e. different to) the indicator which was in the reminder sent by the FIG. 5 operation. The exact form of indicator which is in the stored reminder is selected to be most appropriate to the phone 1.

Figure 7:
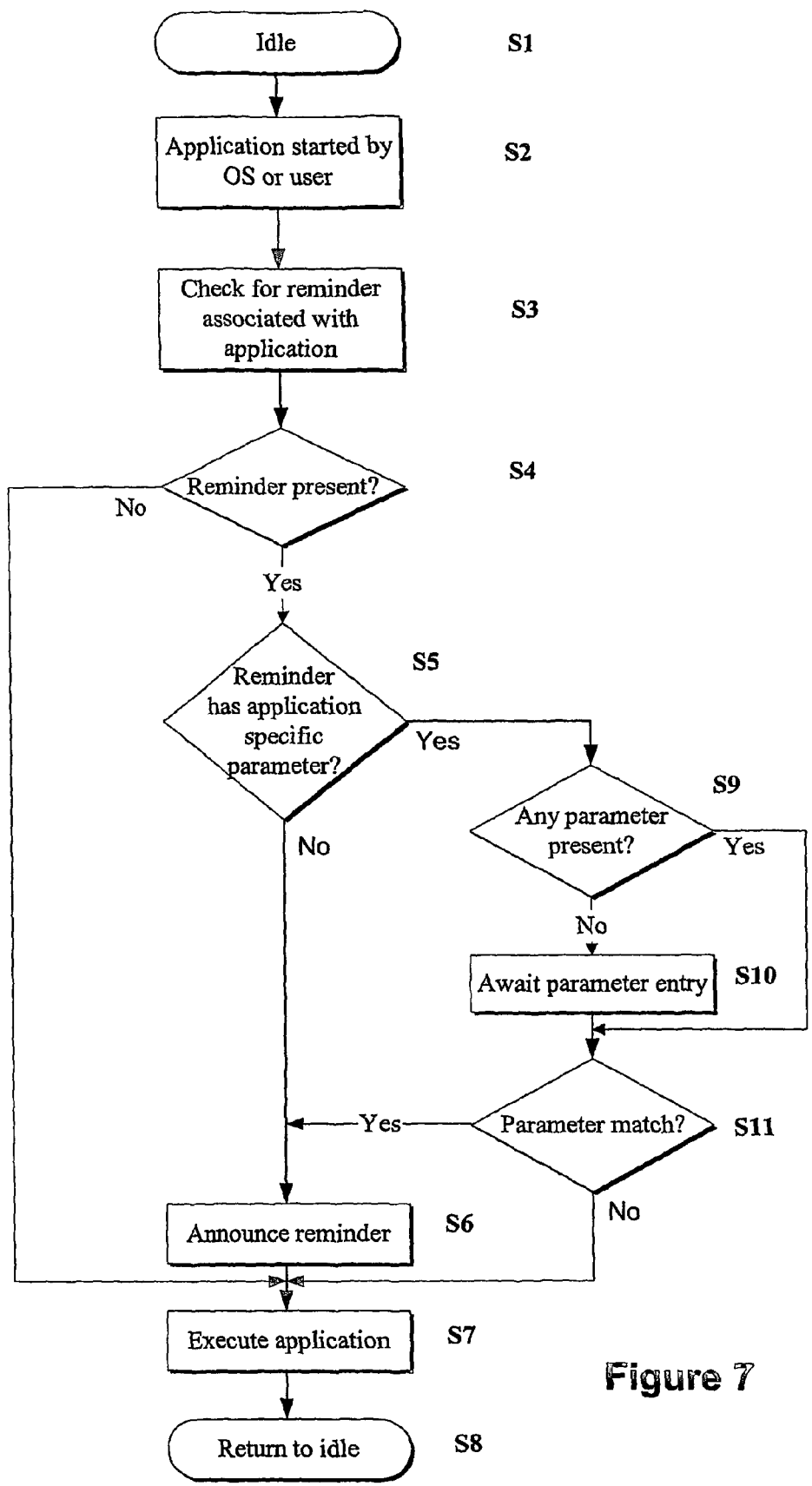
FIG. 7 shows how the FIGS. 1 and 2 phone operates to determine if a reminder requires announcing.

FIG. 7 shows how the phone operates to announce a reminder at an appropriate time. With reference to FIG. 7, the operation begins when the phone is an idle state at step S1. An application, being one of the applications 21 and 31 to 40 shown in FIG. 2, is started at step S2, either by the operating system 30 or by the user. If the phone 1 receives notification that there is an incoming call then the call handling application 31 will be started by the operating system 30. A user may start an application such as a games or a calendar application, and it is not usual for such applications to be started by the operating system 30. At step S3, the phone 1 checks for reminders which are stored in the memory 26, and checks if any of those reminders are associated with the application which was started in step S2. If it is determined at step S4 that a reminder is present which is associated with the application, then progression is made to step S5. Here, it is determined that if the reminder has associated with it an application specific parameter. If there is no such parameter, then operation proceeds to step S6, where the reminder is announced. Following announcement of the reminder in step S6, the application is executed at step S7, and the phone 1 then returns to an idle state at step S8. If it is determined at step S5 that an application specific parameter is associated with the reminder, then progression is made to step S9. Here, it is determined if any parameter associated with the application is present. In the event of an incoming call, then the parameter may be the CLI in which case the parameter will be present on starting the application. If the application being started is the call handling application 31 but the call is an outgoing call, then the parameter will not necessarily be present when the application is started. If a parameter is not yet present, a negative determination is made in step S9, following which the phone 1 awaits a parameter entry at step S10. Following step S10 or following a positive determination at step S9, progression is made to step S11. Here, it is determined whether or not there is a match between the parameter associated with the reminder and the parameter associated with the application that has been started. If there is a match in the parameters, then the reminder is announced at step S6. Otherwise, the application is executed at step S7.

It will be appreciated that the step S11 does not necessarily require there to be identical parameters. For example, the CLI of an incoming call may include the country code for which the call is originating, but the parameter stored in the reminder may not include the country code. In this case, there is clearly a match of the parameters even though the parameters are not identical. Also, there may be a parameter match if the CLI of an incoming call matches with the number pointed at by a phonebook pointer parameter associated with the reminder. Various other occasions in which there will be a parameter match even though the parameters are not identical will be appreciated by those skilled in the art.

The nature of the announcement of the reminder in step S6 may depend on the state of the phone 1, particularly as regards the application which is started at step S2. For example, if the triggering event is an incoming call event, the reminder preferably is displayed on a display of the phone 1 while the call is alerting. In this way, a user will see the reminder displayed on the phone 1 before answering the call. If the reminder is announced in response to an outgoing call event, then the reminder may be displayed on the phone and require acknowledgement before the outgoing call is started.

If no application specific parameter is associated with the reminder, there can be more flexibility as regards at what stage the reminder is announced. For example, if a reminder is required to be announced in response to the event of starting the email application 40, the reminder may be announced before the application is executed, or alternatively, the application may be executed and the reminder announced once the phone 1 has reached a stable state.

Some other examples of the remote setting-up of a reminder follow. In one example, the user of the phone 1 subscribes to a news service using a WAP push feature. Here, when a news service content provider (not shown) determines that there is a news item which is of interest to the user and which the user has not seen, a reminder is prepared. The reminder in this example comprises an indicator which identifies the WAP browser application 33 and includes a note containing a title of the news item and a link to a WAP page where the news story is available. No application specific parameter is present in this example. Once installed in the phone 1, this reminder is activated the next time that the WAP browser 33 is started. The phone 1 preferably enables the URL to be accessed directly via the displayed note, avoiding the user having to reach the desired web page via another route.

In another example, a gaming website prepares and sends a reminder triggered by the user reaching a new gaming level whilst playing a game on the website. Here, the reminder includes an indicator identifying the WAP browser application 33, and a note giving a URL and text indicating what can be found at that URL. If no parameter is included, then the reminder is announced the next time that the WAP browser 33 is started. Alternatively, the reminder could include an application specific parameter being the URL of the gaming website, so the reminder is announced only when the user next accesses the website.

The exact mode of announcement of the reminder is not critical to the invention. Announcement may be by way of display of text or a picture on the display 3, by way of vibrating alert, a sound alert, by way of a flashing of the backlight of the display, or by any combination of these. Other means for announcing a reminder will be apparent to those skilled in the art.

The exact means for storing the reminders is not critical to the invention. For example, reminders may be stored on the flash ROM 17b, in the RAM 17a (only while the phone 1 is in a power-on state), or in the working memory 26. The reminders may or may not be stored in an area dedicated for use by the reminder control application 22.

Although in the above embodiments it is described that a note can be entered and associated with a reminder, this is not essential. In some circumstances, it may not be necessary to associate any kind of note or other input with a reminder, i.e. it may be sufficient to the user that announcement is made even if there is no indication of what the reminder is associated with. Alternatively, it may be desired to associate with a reminder another kind of input, such as a picture, a melody, a sequence of light flashes, or similar. The input may take the form of a recorded sound, received, for example, through the voice memo application 36. The exact form of input associated with a reminder is not essential to the implementation of the invention.

The invention claimed is:

1. A method comprising:
    in operating a mobile communications device, receiving a request to create a reminder item;
    in response to receiving the request, receiving a selection of a recipient of the reminder item, receiving a note and receiving a selection of a trigger application on a device of the recipient which is to trigger an output of the note at the device of the recipient, where the selected trigger application is one of a plurality of user selectable trigger applications;
    generating the reminder item comprising an indication of the trigger application, the note and an indication of the recipient, where the reminder item further comprises at least one application specific parameter; and
    sending the reminder item to the recipient where the recipient is remote from the mobile communications device,
    where the reminder item is configured to output the note in response to an application start event for a first application,
    where the first application is associated with the reminder item,
    where the application start event being an event of starting the first application, and
    where the note is output in response to a determination that the first application is associated with at least one stored reminder item and in response to a determination that a parameter associated with the first application corresponds with the application specific parameter.

2. A method as claimed in claim 1, further comprising displaying a list of applications which may be selected as the trigger application which is to trigger the output of the note.

3. A method as claimed in claim 1, further comprising receiving an additional input, and associating the input with the reminder item.

4. The method as claimed in claim 1, further comprising receiving a selection of the application specific parameter, where the application specific parameter is one of: a resource address, a device setting associated with the trigger application and an application sub-routine of the trigger application.

5. The method as claimed in claim 4, where the application specific parameter comprises a URL of a website.

6. The method as claimed in claim 4, where the application specific parameter comprises a value indicating a number of phonebook entries when a backup copy was made.

7. The method as claimed in claim 1, where the trigger application is one of: a gaming application and a web browsing application.

8. The method as claimed in claim 1, where the note comprises at least one of: text, audio content and image content.

9. A method comprising:
    in operating a mobile communications device, receiving, from a remote device, a received reminder item comprising a note, an indication of a trigger application on the mobile communications device which is to trigger an output of the note at the mobile communications device and an indication of the mobile communications device, where the remote device is remote from the mobile communications device and where the indicated trigger application is one of a plurality of selectable trigger applications, where the received reminder item further comprises an application specific parameter;
    in response to receiving the received reminder item, determining whether the received reminder item is compatible with capabilities of the mobile communications device;
    in response to determining that the received reminder item is compatible, associating the received reminder item with the trigger application and storing the received reminder item in a memory;
    in response to an application start event for a first application, determining whether the first application is associated with the received reminder item, where the application start event being an event of starting the first application;
    in response to determining that the first application is associated with at least one stored reminder item, determining whether to output the note, where determining whether to output the note comprises determining whether a parameter associated with the first application corresponds with the application specific parameter; and
    in response to determining to output the note, outputting the note at the mobile communications device.

10. The method as claimed in claim 9, further comprising:
    in response to determining that the received reminder item is compatible, requesting confirmation that the reminder item is to be processed.

11. The method as claimed in claim 9, further comprising:
    in response to receiving the confirmation, displaying the received reminder item and requesting approval for the received reminder item to be used,
    where associating the received reminder item with the trigger application and storing the received reminder item in the memory is only performed in response to the approval being received.

12. The method as claimed in claim 9,
    where the application specific parameter is one of: a resource address, a device setting associated with the trigger application and an application sub-routine of the trigger application.

13. The method as claimed in claim 9, where the trigger application is one of: a gaming application and a web browsing application.

14. The method as claimed in claim 9, where the note comprises at least one of: text, audio content and image content.

15. A non-transitory computer readable medium tangibly encoded with a computer program executable by a processor to perform actions comprising:

receiving, at a mobile communications device, a request to create a reminder item;

in response to receiving the request, receiving a selection of a recipient of the reminder item, receiving a note and receiving a selection of a trigger application on a device of the recipient which is to trigger an output of the note at the device of the recipient, where the selected trigger application is one of a plurality of user selectable trigger applications;

generating the reminder item comprising an indication of the trigger application, the note and an indication of the recipient, where the reminder item further comprises at least one application specific parameter; and sending the reminder item to the recipient where the recipient is remote from the mobile communications device, where the reminder item is configured to output the note in response to an application start event for a first application, where the first application is associated with the reminder item, where the application start event being an event of starting the first application, and where the note is output in response to a determination that the first application is associated with at least one stored reminder item and in response to a determination that a parameter associated with the first application corresponds with the application specific parameter.

16. The computer readable medium as claimed in claim 15, where the actions further comprise displaying a list of applications which may be selected as the trigger application which is to trigger an output of the note.

17. The computer readable medium as claimed in claim 15, where the actions further comprise receiving an additional input, and associating the input with the reminder item.

18. The computer readable medium as claimed in claim 17, where the note comprises at least one of: text, audio content and image content.

19. A non-transitory computer readable medium tangibly encoded with a computer program executable by a processor to perform actions comprising:

receiving, from a remote device at a mobile communications device, a received reminder item comprising a note and an indication of a trigger application on the mobile communications device which is to trigger an output of the note at the mobile communications device and an indication of the mobile communications device, where the remote device is remote from the mobile communications device and where the trigger application is one of a plurality of selectable trigger applications, where the received reminder item further comprises an application specific parameter;

in response to receiving the received reminder item, determining whether the received reminder item is compatible with capabilities of the mobile communications device;

in response to determining that the received reminder item is compatible, associating the received reminder item with the trigger application and storing the received reminder item in a memory;

in response to an application start event for a first application, determining whether the first application is associated with the received reminder item, where the application start event being an event of starting the first application;

in response to determining that the first application is associated with at least one stored reminder item, determining whether to output the note, where determining whether to output the note comprises determining whether a parameter associated with the first application corresponds with the application specific parameter; and in response to determining to output the note, outputting the note at the mobile communications device.

20. The computer readable medium as claimed in claim 19, where the note comprises at least one of: text, audio content and image content.

21. An apparatus, comprising at least one processor; and at least one memory including computer program code, the at least one memory and the computer program code configured to, with the at least one processor, cause the apparatus to perform at least the following:

to receive a request to create a reminder item;

in response to receiving the request, to receive a selection of a recipient of the reminder item, to receive a note and to receive a selection of a trigger application on a device of the recipient which is to trigger an output of the note at the device of the recipient, where the selected trigger application is one of a plurality of user selectable trigger applications;

to generate the reminder item comprising an indication of the trigger application, the note and an indication of the recipient, where the reminder item further comprises an application specific parameter; and to send the reminder item to the recipient where the recipient is remote from the apparatus, where the reminder item is configured to output the note in response to an application start event for a first application, where the first application is associated with the reminder item, where the application start event being an event of starting the first application, and where the note is output in response to a determination that the first application is associated with at least one stored reminder item and in response to a determination that a parameter associated with the first application corresponds with the application specific parameter.

22. The apparatus as claimed in claim 21, where the at least one memory and the computer program code are further configured to cause the apparatus to display a list of applications which may be selected as the trigger application which is to trigger an output of the note.

23. An apparatus, comprising at least one processor; and at least one memory including computer program code, the at least one memory and the computer program code configured to, with the at least one processor, cause the apparatus to perform at least the following:

to receive, from a remote device at a mobile communications device, a received reminder item comprising a note, an indication of a trigger application on the mobile communications device which is to trigger an output of the note at the mobile communications device and an indication of the mobile communications device, where the remote device is remote from the mobile communications device and where the trigger application is one of a plurality of selectable trigger applications, where the received reminder item further comprises an application specific parameter;

in response to receiving the received reminder item, to determine whether the received reminder item is compatible with capabilities of the mobile communications device;

in response to determining that the received reminder item is compatible, to associate the received reminder item with the trigger application and to store the received reminder item in a memory;

in response to an application start event for a first application, to determine whether the first application is associated with the received reminder item, where the application start event being an event of starting the first application;

in response to determining that the first application is associated with at least one stored reminder item, to determine whether to output the note, where determining whether to output the note comprises determining whether a parameter associated with the first application corresponds with the application specific parameter; and in response to determining to output the note, to output the note at the mobile communications device.

* * * * *